3,198,625
PURIFICATION OF ALUMINUM
Philip T. Stroup, New Kensington, Pa., assignor to Aluminum Company of America, Pittsburgh, Pa., a corporation of Pennsylvania
No Drawing. Filed Feb. 8, 1961, Ser. No. 87,764
3 Claims. (Cl. 75—68)

This invention relates to the separation from aluminum of certain metallic impurities which occur in but small amounts, especially those which form solid intermetallic compounds with aluminum while the aluminum is in the molten condition and which are substantially insoluble in solid aluminum at room temperature.

Aluminum, as smelted, contains various metallic impurities, the amount generally being less than 1% by weight. Impurities can also be introduced during normal melting operations and from the use of scrap material. The impurities occurring in metal coming from the smelting operation are derived from the raw material being smelted and to some extent from the materials used in the construction and operation of the smelting unit. Among the impurities frequently found in electrolytically produced aluminum and in remelted metal are the high melting point elements titanium, chromium, vanadium and zirconium. These elements usually occur in but minute quantities, the total generally being less than 0.05% by weight. In many cases, their presence can be disregarded because they have no significant effect upon the properties of the end product but where a high purity product is demanded, their effect must be taken into account, for example, their adverse effect upon the appearance of surface finishes, resistance to corrosion and electrical conductivity.

To minimize such adverse effects it has been the practice to refine the aluminum by an electrolytic process and thereby reduce the total amount of impurities in the metal. This is an expensive operation and consequently has limited a wider use of metal which has been so refined. There has been a need for the selective separation of the above-mentioned impurities.

This invention is addressed to the selective separation of the foregoing impurities from aluminum and has as its primary object the provision of a simple and economic process for accomplishing this result. A further object is to provide a process which effects separation of these impurities without introducing any undesirable substance in the purified metal.

It has been found that the addition of boron to aluminum containing a very small amount of at least one of the group of metallic impurities composed of titanium, chromium, vanadium and zirconium, the amount of boron being proportioned to the quantity of said impurities, serves to substantially reduce, if not completely remove, these impurities from aluminum by precipitation of a boron-containing compound or complex having a higher density than that of molten aluminum. This treatment is particularly beneficial in purifying aluminum which contains a total of less than 0.05% of the above-named impurities. Although the precise mechanism of the reaction and combination is not known, the use of the boron has nevertheless been demonstrated as being a highly effective means of removing a part or all of the aforementioned impurities. While a trace of these impurities may remain in the treated metal, yet for practical purposes the boron-treated aluminum may be said to be substantially free from them, assuming, of course, that enough boron has been added to combine with all of the reactable impurities. It has also been observed that the addition of boron has substantially no effect upon the removal of other common impurities such as iron, silicon, copper and the like. The process has been found to be useful in treating commercial aluminum of a purity of 99.4% and higher.

The process is carried out by introducing the element boron in reactive form into a melt of aluminum containing a small amount of at least one of the herein defined impurities in the proportion of at least two atoms of boron for each atom of the metallic impurity to be removed. From a practical standpoint, however, it is desirable to add up to about 25% by weight in excess of that proportion. Normally, the heavy reaction product will settle relatively rapidly if the body of molten metal is kept in a quiescent state, and the liquid can then be removed by decanting, filtering or centrifuging or by other known separation methods. The molten metal so removed can be transferred to molds or other receptacles, if desired.

Reference has been made to certain metallic impurities occurring in aluminum which combine with boron and form a precipitate having a greater density than that of molten aluminum. It is important to note that not all metals which form compounds with boron wil react with that element in the environment of molten aluminum. It has been observed that the action of this element toward titanium, chromium, vanadium and zirconium is quite specific in the presence of molten aluminum.

Any boron which remains in the aluminum after separation of the impurities is generally not harmful, as far as is known, since the amount is very small. Under some conditions, however, even such small amounts may enhance some useful property of the aluminum. The amounts which may remain in the purified metal are generally less than 0.01%.

In treating aluminum containing the above-mentioned impurities the metal is melted and maintained in a liquid condition during the entire period of treatment. In the preferred practice of the invention the molten charge should be heated to a temperature of at least 1230° F. and generally not over 1500° F. The boron may be added to the melt of impure aluminum in the form of an aluminum-boron-rich alloy, for example, one containing 1 to 5% boron or a suitable quantity of a decomposable compound such as a fluoborate, borax or boric oxide. The former method is usually preferred because of the absence of any saline residue or fluid reaction product, but it is to be understood that both the rich alloy and decomposable compounds yield boron in a reactive condition. The amount of boron to be used is based on the quantity present in the alloy or compound. After the calculated amount of boron has been added in the form of an alloy or decomposable compound which is stirred into the melt, the treated metal should be allowed to stand or remain in a quiescent condition for a minimum period of 15 minutes and preferably held at a temperature above 1230° F. The length of the quiescent period in any case depends upon the size of the aluminum charge being treated and may cover a period of several hours, for example, 4 or 5 hours, and even longer, to permit as nearly complete precipitation and settlement as possible. At the end of the holding period the molten metal is separated from the precipitated boron-containing compound or complex by any convenient method such as decanting, filtering or centrifuging.

As an illustration of the invention the following example is cited.

A 1500-pound charge of aluminum containing 0.004% titanium, 0.002% chromium, 0.002% vanadium and 0.002% zirconium was melted and brought to a temperature of 1320° F. An aluminum-3% boron alloy was added to provide 0.005% boron in the melt and the mixture then well stirred. Following the addition and stirring the molten body was held in a quiescent state for a period of 4 hours whereupon the liquid metal was poured off. The chemical analysis of the melt revealed the presence of none of the impurities mentioned above and only 0.002% boron in the aluminum.

Having thus described the invention I claim:

1. A method of selectively separating small amounts of certain metallic impurities from aluminum, the impurities consisting of at least one of the group of metals composed of titanium, chromium, vanadium and zirconium, the total amount of said impurities not exceeding 0.05%, said method comprising melting and heating the impure aluminum to 1230 to 1500° F., adding boron thereto in the proportion of at least two atoms of boron for each atom of metallic impurity, stirring the melt with the boron addition therein, halting the stirring and maintaining the melt in a quiescent condition for a period of at least 15 minutes whereby solid particles of a reaction product between boron and the metallic impurity are allowed to settle, and thereafter separating the liquid metal from the solid particles containing boron, said liquid metal containing not more than 0.01% of boron.

2. The method acording to claim 1 wherein the impure aluminum being treated is of a purity of at least 99.4%.

3. The method according to claim 1 wherein the proportion of boron to metallic impurity exceeds by an amount up to 25% by weight the minimum amount of boron as defined by the ratio of boron to impurity.

References Cited by the Examiner

UNITED STATES PATENTS

| | | | |
|---|---|---|---|
| 1,921,998 | 8/33 | Bonsack | 75—68 |
| 2,974,032 | 3/61 | Grunert et al. | 75—68 |

BENJAMIN HENKIN, *Primary Examiner.*

WINSTON A. DOUGLAS, ROGER L. CAMPBELL, *Examiners.*